Oct. 14, 1969  R. S. WASHBURN  3,472,159
SCREW PRESSES

Filed Feb. 19, 1965  6 Sheets-Sheet 1

Robert S. Washburn
INVENTOR.

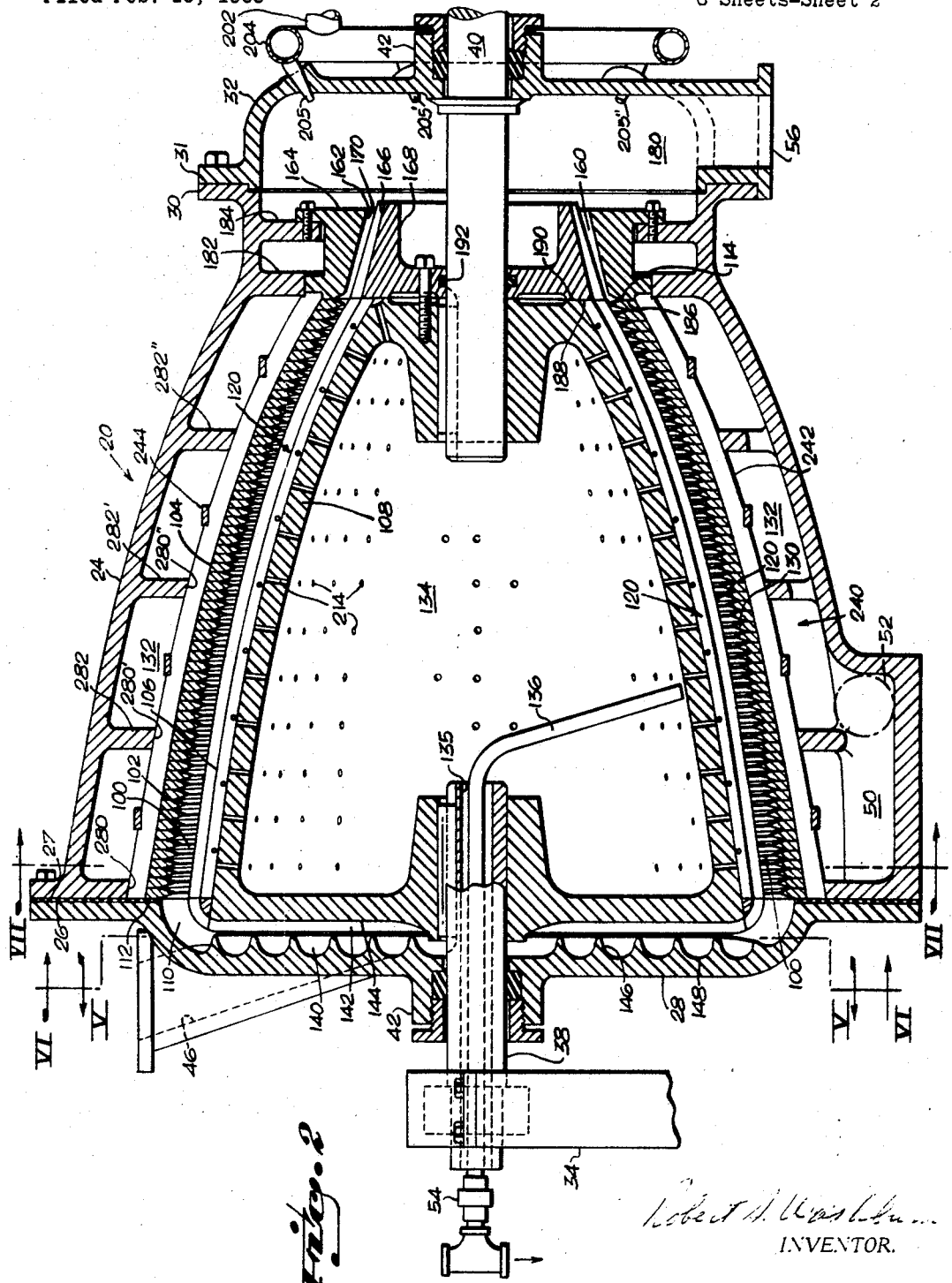

Robert S. Washburn
INVENTOR.

Oct. 14, 1969  R. S. WASHBURN  3,472,159
SCREW PRESSES

Filed Feb. 19, 1965  6 Sheets-Sheet 4

INVENTOR.
Robert S. Washburn

Oct. 14, 1969          R. S. WASHBURN          3,472,159
                         SCREW PRESSES
Filed Feb. 19, 1965                      6 Sheets-Sheet 5

INVENTOR.

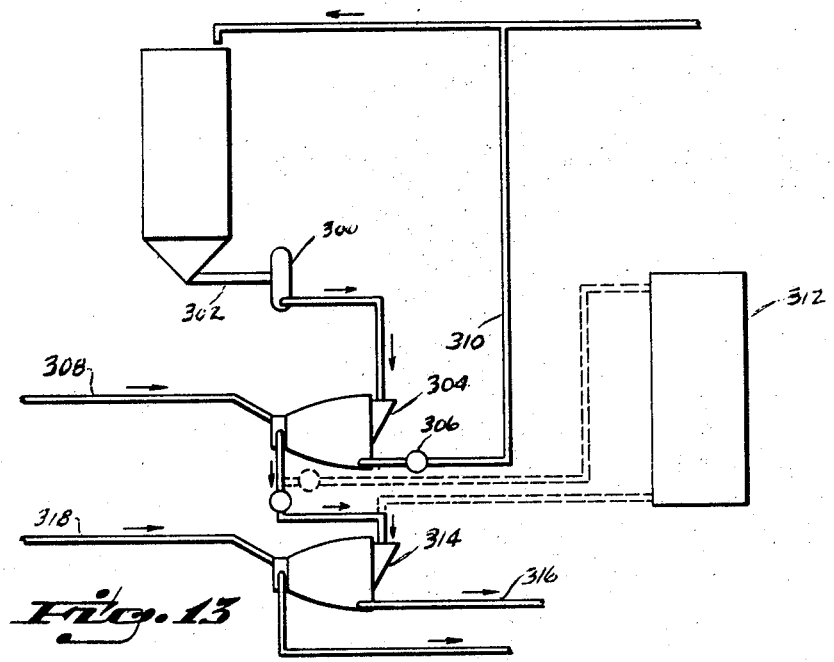
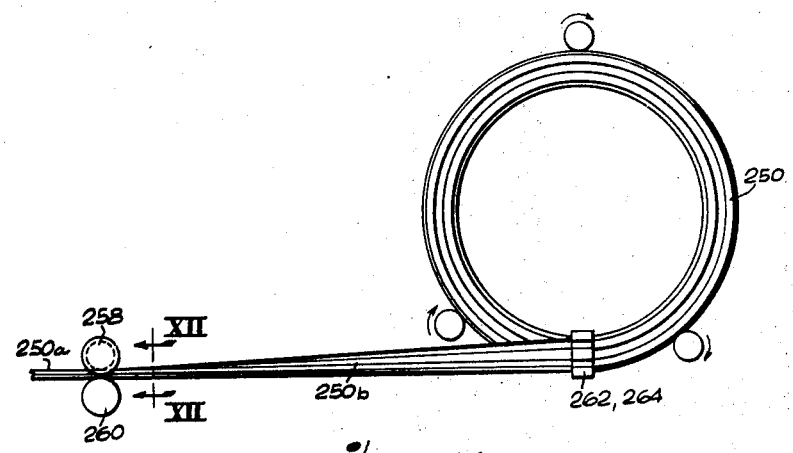

United States Patent Office 3,472,159
Patented Oct. 14, 1969

3,472,159
SCREW PRESSES
Robert S. Washburn, Nassau, Bahamas
(P.O. Box 9201, Akron, Ohio 44305)
Filed Feb. 19, 1965, Ser. No. 433,962
Int. Cl. B30b 9/14, 3/06, 15/30
U.S. Cl. 100—117
16 Claims The instant invention relates to apparatus for continuously separating liquids from solids and to successive separations of a solid material from a plurality of successive different liquids as in washing processes.

Heretofore continuous separation of liquids from solids, intermixed in the form of pulp or slurry, has been accomplished in devices generally called screw presses characterized by a rotating shaft or screw, having "worm" or "screw-threads" thereon, turning concentrically within a cylindrical or staright coned screen member. The instant invention, though differing in significant respects, does employ a "screw-thread" and may so be classed as a "screw press."

Screen members, the filter septum for presses of the prior art, having been constructed of perforated metal sheet or of woven wire fabric, generally incapable of resisting outward pressures due to compression of pulp therein and tending to bulge outwardly between supports. Pulps travel in such presses generally in a short straight path about equal to the axial length of the screw. Compression rate thus tends to be rapid. The pulp mass is not intended to revolve with the screw, though too frequently it does so, thereby ceasing forward progress through the press.

Generally no account seems heretofore to have been taken of the rate of travel of liquid through the mass of pulp, nor of the changes in such rate resulting from the volume reduction during pressing, except as incidental to the use of coned screen member or screw shaft. Relatively deep masses of pulp between threads or flights of the screw result in excessive and varying flow velocities in the liquid so that fines tend to be flushed away. In some cases compression is too rapid and liquid cannot escape through the compressed mat, or in escaping overstresses and thus breaks long fibers into fines.

These and other limitations have made screw presses inapplicable to the separation of liquids from certain solids, especially the compressible fibrous pulps basic to the making of paper.

Absence of satisfactory methods and apparatus for mechanically expressing liquids from paper-making pulps, has prolonged use of equipment for washing and for bleaching pulps which requires great volumes of water and other liquids and from which the losses in fine fibrous raw material and in chemicals are significant items in cost of manufacture.

Accordingly, an object of the present invention is to overcome the disadvantages of the prior art and to provide apparatus avoiding the mentioned difficulties and others.

Another object of the invention is to provide screw type press apparatus in which compression is slow but throughput high, in which the thickness of a pulp layer through which liquid must escape is minimized and its velocity therefore is minimum.

A further object is the provision of a screw type press in which the rate of compression varies smoothly in direct proportion to the liquid removed.

It is a further object of the invention to provide an apparatus for the continuous treatment of pulp wherein the pulp material is soaked or saturated with a liquid, that liquid expressed by smoothly increasing continuous mechanical compression of the solid material, holding the compressed pulp for a suitable time, elastically reexpanding the solid in the presence of other liquid thereby resaturating the solid material, and repeating the sequence as desired, as, for example, for the continuous washing or bleaching of pulps.

An additional object of the instant invention is the provision of a screen member or filter septum and elements thereof of strength, stiffness, and durability, having a surface over which pulp can slide with little frictional resistance, yet having substantial open area of fine relatively non-clogging liquid passages therethrough.

A yet additional object of the present invention is the provision of apparatus for continuous preparations and treatment of pulps with lessened demand for water, to save water resources, and to reduce losses of both fiber material and chemicals, and achieve cleaner effluent, thereby reducing stream pollutions and manufacturing costs.

Still another object of the invention is to produce apparatus for pressing and like treatment of pulses at temperatures and pressures suited to the material and to associated process stages, thereby to conserve heat energy.

Other objects and advantages also will be apparent as in the course of the following descriptions and in the drawings related thereto by reference numerals. In the drawings:

FIGURE 2 is a view in longitudinal cross sectional elevation showing the interior construction of the press of FIGURE 1.

FIGURE 11 is a schematic diagram of novel apparatus adapted to form elements of the structure of the instant invention.

FIGURE 12 is a cross section view of an intermediate form of one of the elements of the structure of the instant invention.

FIGURE 13 is a simplified flow diagram illustrating a process embodying the instant invention.

In the description of a specific preferred embodiment, its mode of operation, features and advantages which follows, identical numerals of reference denote the same elements in each of the several figures.

Figure 1:
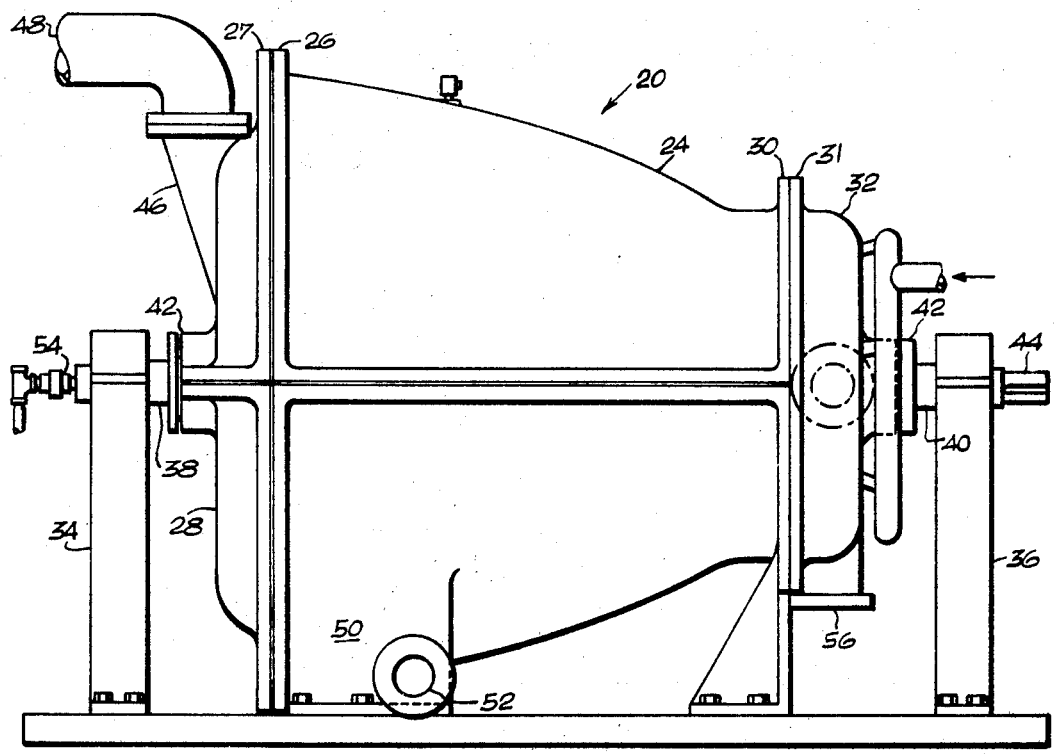
FIGURE 1 is a side elevational view of a liquor extraction press embodying the principles of the instant invention.

FIGURE 1 shows the liquor extraction press 20 according to the instant invention, in a side elevational view. The main body member 24 extends from a bolting flange 26 to a bolting flange 30. The flange 27 of a head 28 is secured to the flange 26. The flange 31 of a pulp chamber housing 32 is, in like manner, bolted to flange 30. Together these members form a liquid and pressure tight enclosure. A pair of bearing pedestals 34 and 36 support the coaxial journals 38 and 40 respectively, in suitable bearings. The head 28 and the housing 32 each have stuffing boxes 42 of conventional design, encompassing the journals 38 and 40 to prevent leakage therealong. The journal 40 terminates in a drive tang 44 for coupling to any suitable drive means (not shown).

Material to be deliquored, referred to herein as pulp, is fed continuously into a spout 46 through the pipe 48, or suitable equivalent means. Liquid expressed during operation flows to a sump 50 for discharge at the flanged outlet 52, which is preferably equipped with a valve (not shown). Liquid may also be discharged through the hollow journal 38 and through the rotary joint 54.

The deliquored material, that having some or all of its liquid removed, referred to herein as dry pulp or cake, may be dropped by gravity through outlet 56, or may as shown later herein be rewetted and discharged through outlet 56 as slurry to subsequent processing.

FIGURE 2 is a view in longitudinal cross sectional elevation showing the interior construction of the press according to the present invention.

Within the press 20 the plup is deliquored in a compression zone 100 which is defined by the "threaded" surface 102 of shell 104 and the "bladed" surface 106 of rotor 108 and which zone extends from entrance 110 at the shell end face 112 to the shell opposite end 114. This zone 100 is progressively decreasing in anular area. The mean, or pitch surface (an imaginary surface chosen to represent the average annular area, i.e., annular area outside the pitch surface is equal to the annular area inside it) of the annular compression zone 100 is a conoid, i.e., a surface generated by revolving a curved line about an axis.

Figure 3:
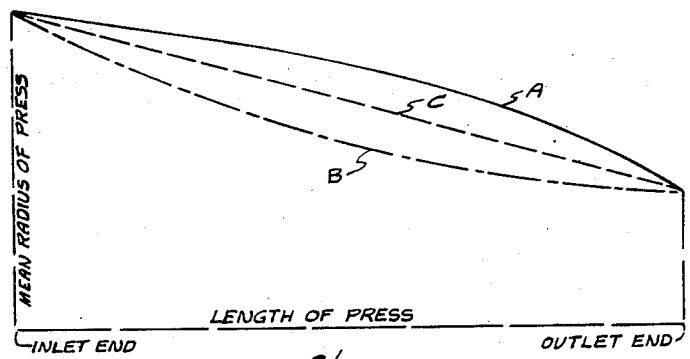
FIGURE 3 is a graphical-mathematical representation of features of the instant invention.

FIGURE 3 is a graphic representation of three such generating lines plotted with mean diameters as ordinates and press length as abscissa. The preferred conoid is generated by revolving the curve A about the central longitudinal axis of the press.

Curve A represents the mean diameter obtained by proportionally reducing the pulp layer thickness while removing equal increments of liquid volume at each successive increment of axial distance. Curve B similarly represents mean diameter proportionally reduced while removing a constant percentage of volume remaining, i.e., 0.10× volume in each 1/10 increment of axial distance. This curve B generates a conoid having only the advantage of slightly reduced friction torque. It is more difficult to manufacture, and results in considerably higher flow velocities of liquid expression at the wet or inlet end. Curve C represents the compromise of maximum manufacturing simplicity.

Refer again to FIGURE 2, pulp is moved along the compression zone 100 by the combined action of the "threaded" surface 102 and the "bladed" surface 106 of the rotor 108. An annular mass of pulp slides around, circumferentially, within the shell 104 urged by a series of blades 120 (more clearly shown in FIGURE 4) on the rotor surface. Threads 130 (shown enlarged in FIGURE 10) of the surface 102, are wound into a helix, much like a closed coil spring, and gently urge the sliding pulp mass onward through the compression zone 100. Thus the rate of compression is relatively slow.

One of the features of the invention is the structure of shell 104 and of rotor blades 120 enabling the use of either or both as filter septum so as to pass the expressed liquor therethrough while retaining the greatest part of the solids. Details of this construction will be more fully disclosed in connection with FIGURES 8 and 10 hereinbelow.

In the preferred embodiment shown in FIGURE 2, both shell 104 and rotor 108 permit expressed liquid to pass therethrough. Liquid passing through shell 104 is received in the body cavity 132 and drained to the sump 50 from which it is discharged at the outlet 52. Liquor passing through the "bladed" surface 106 of the rotor 108 is received in the rotor cavity 134 from which it is discharged either directly through the bore 135 of the hollow journal 38, or through a conventional siphon 136 and rotary union 54. Rewetting, back through the filter septum, cannot occur unless the pressure within cavities 132 and 134 exceeds that in the inlet spout 46.

Figure 6:
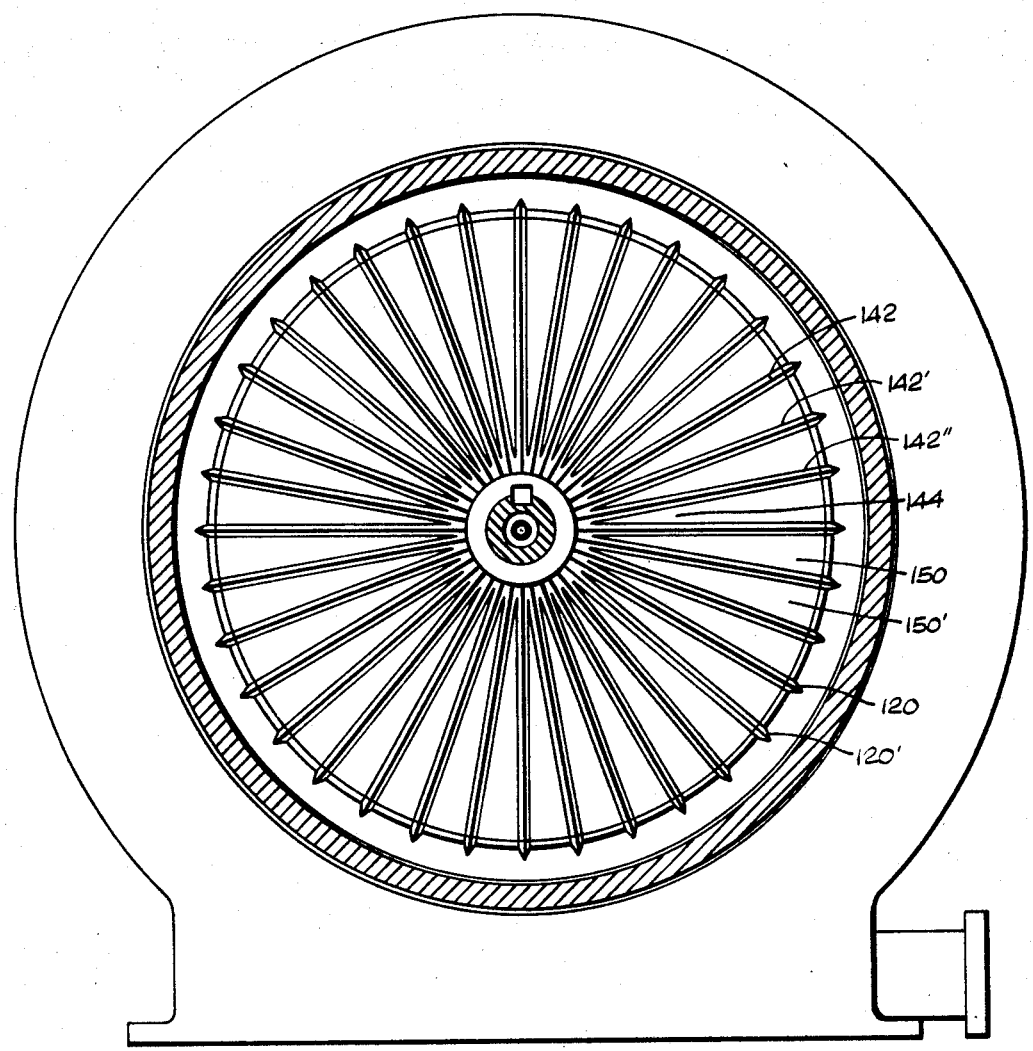
FIGURE 6 is an end elevational view of the rotor according to the invention and section of the press, taken on line VI—VI of FIGURE 2.
Figure 5:
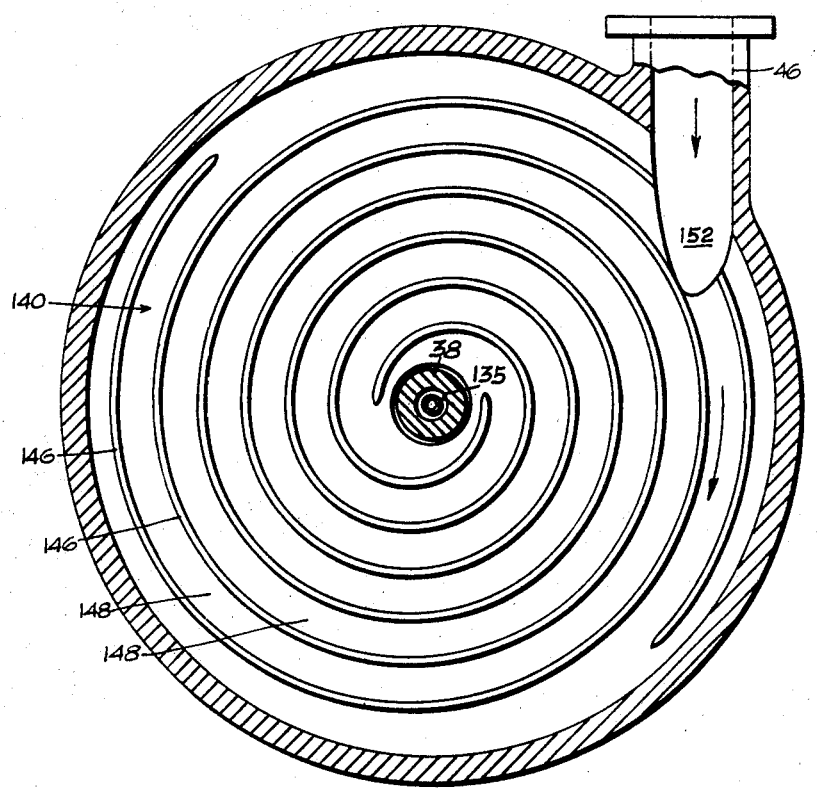
FIGURE 5 is a view in end elevational cross sections taken on line V—V of FIGURE 2, showing the interior of the press head.

Incoming pulp fed through the spout 46 is regulated and distributed by the coaction of a scroll 140 in the head 28 and the radial vanes 142 on the rotor end wall 144. FIGURE 5 (an elevation view of head 28 taken on line V—V of FIGURE 2) shows the scroll 140 comprising a pair of ridges 146 spiralling radially outward and defining a corresponding pair of grooves 148 therebetween. FIGURE 6 (an elevational view of the rotor end wall 144 taken on line VI—VI of FIGURE 2) shows an array of radial vanes 142 fixed on the end wall 144 to form a series of pockets 150 therebetween. Rotation of the rotor 108 brings a succession of vanes 142 and pockets 150 downward across the inlet spout opening 152 sweeping pulp along the scroll ridges 146. The outward spiral lead of the scroll 140 urges pulp smoothly and steadily into the entry 110 to compression zone 100. This coaction also serves to minimize the deposition of pulp near the journal 38.

The vanes 142 meet, match and blend with blades 120 to insure unimpeded flow of pulp into the compression zone 100.

While many pulps are quite fluid and feed readily into the compression zone, others tend to plug. The inlet spout 46, grooves 148 and pockets 150 should be carefully sized, for the volume per revolution in the feed-distributing zone should be substantially equal to the volumetric capacity of the compression zone 100.

Pulp reaches its maximum compression, i.e., minimum volume, at the small or dry end 114 of the shell 104 and here enters the "dry zone" 160 (shown in FIGURE 2) defined by the inner conical surface 162 of the stator ring 164 and the outer surface 166 of the rotor end ring 168. No liquid is intentionally removed in the zone 610; its purposes are to prevent premature reexpansion of the cake and to block pressure or flow between the compression zone 100 and pulp chamber 180. The zone 160 therefore is of constant annular area, equal to the area of the compression zone 100 at the stator end 114. The ring 164 is seated in a web 182 and bolted to an internal flange 184, so that its face 186 is snug against shell end face 114.

The stator ring 164 is preferably of hard material, resistant to abrasion and corrosion. Its inner surface 162 may be "threaded" with lead and pitch substantially equal to that used in the shell 104, if desired.

The rotor end ring 169 carries blades 170 meeting, matching and blending with blades 120 or rotor 108, and is bored to fit coaxially on the journal 40. The rotor end ring 188 is bolted snugly against the rotor end surface 190. An O-ring 192 insures against leakage along the journal 40.

FIGURE 2 further shows the pulp chamber 180 in the housing 32 into which the cake is delivered from the "dry zone" 160. The dry pulp cake may, if desired, be discharged from outlet 56 as cake without further treatment. Often, as with paper making pulp, it is preferred or required to rewet the cake with a second, usually different liquid for additional treatment or to enable pumping of material to subsequent use or treatment.

As the pulp cake leaves the "dry zone" 160 it reexpands elastically. Rewetting liquor is introduced through a connection 202 to a sparger ring 204 and the nozzles 205, 205′, 205″ to obtain turbulent mixing of the cake and liquor. The reexpansion of the pulp while immersed, like a sponge under water, takes up the second liquor thus supplied very thirstily.

Figure 4:
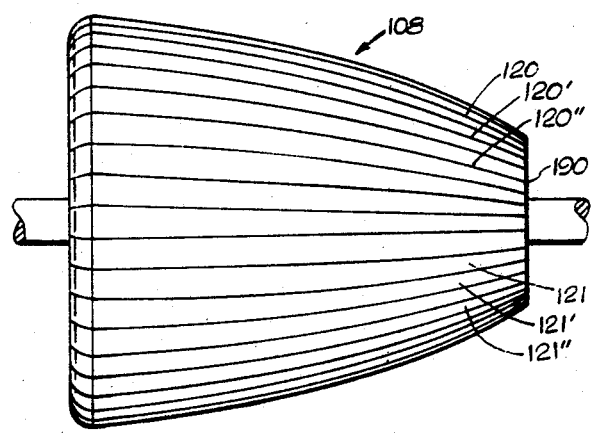
FIGURE 4 is a view in side elevation of the rotor according to the invention.

Particular features of the rotor 108 have been described hereinabove. FIGURE 4 is a side elevation view of the rotor 108 showing the conoid outline described, and the blades 120, 120', 120" . . . defining grooves 121, 121', 121" . . . on and in which pulp travels longitudinally. As has been described, pulp moves around with rotation of the rotor 108 and along with the helical lead of the thread 130. Rolling, tumbling and mixing of the pulp is generally not desired within the compression zone 100. Pulp, especially fibrous pulps such as those used in paper making, exhibits considerable "mesh strength," i.e., resists shear and tension because of the inter-tangling of fibers. (Chemical or intermolecular forces are less significant in the pulp stage.) Grooves relatively small in width and depth are therefore preferred.

At the rotor end face 190 the width of the grooves 121 should approximately equal their depth. As many blades 120 as can be suitably supported securely in the wall 210 of the small end of the rotor 108 should be used.

Figure 7:
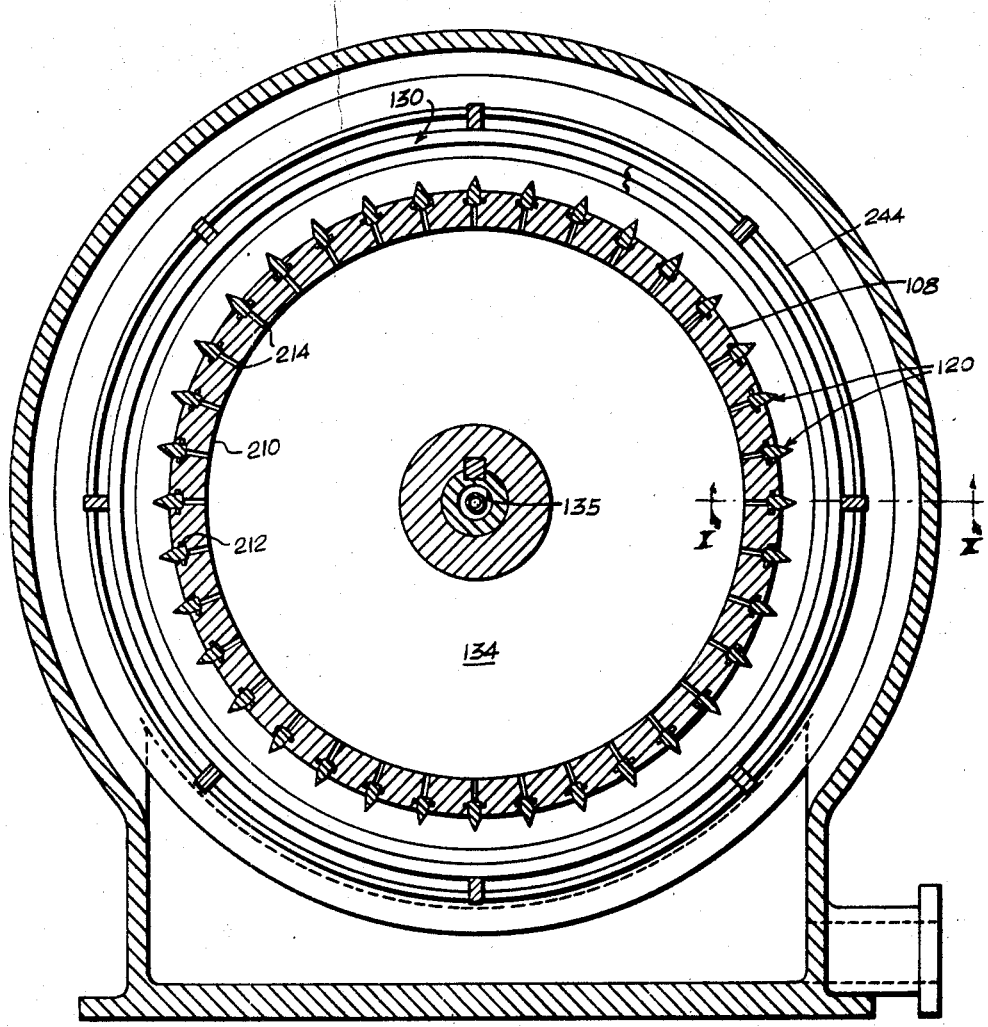
FIGURE 7 is a view in end elevational cross sections taken on line VII—VII of FIGURE 2 showing the interior of the press.
Figure 8:
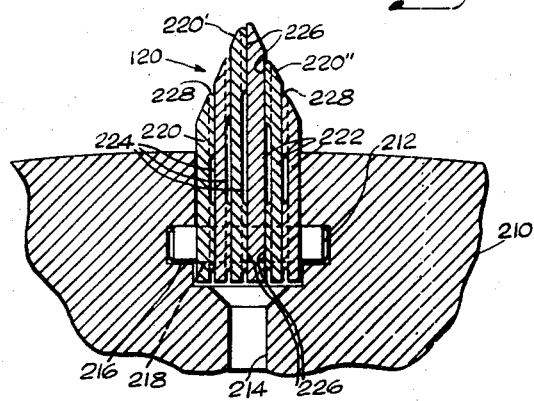
FIGURE 8 is an enlarged detail view in cross section of a typical rotor blade embodying principles of the present invention.

In the preferred embodiment shown, blades 120 are bedded in T-slots 212 cut in the wall 210 of the rotor 108, FIGURE 7. Each of the slots 212 communicates through the wall 210 with the rotor cavity 134 by means of a plurality of drilled holes 214 (FIGURES 2, 7, 8). FIGURE 8 shows, in enlarged cross section, the structure and method of attachment of a blade 120 to the rotor wall 210. Each blade 120 is held in its T-slot 212 by a number of pins 216 which are passed snugly through suitable holes 218 through the blade 210.

The construction of blades 120, 120' . . . is a further feature of the instant invention. Each blade is an assembly of a number of strips 220, 220', 220" of indefinite length (six being shown in FIGURE 8) each of which has one flat side 222. The opposing substantially parallel side 224 (see FIGURE 9) of a lesser number of strips 220 has a pair of finely knurled lands 226 along its length (giving a pattern like the milled edge of a new coin). The ridges 227 of the fine knurling of the land 226 press against the flat side of the adjacent strip 220 in the assembly. The grooves 229 between the ridges thus become passages 228 through which liquid can flow. The so assembled strips 220 thus become a deep screen or filter septum of strength and durability, having a surface over which pulp can slide with little frictional resistance.

Although one entire side of strip 220 could be knurled or milled, the use of raised lands results in shorter fluid passages and in easier knurling, hence is preferred. Furthermore, in the present modification, each blade 120 can be compressed slightly to secure a tight fit in its T-slot 212.

Expressed liquid travels through knurled passages 228, through T-slots 212, through the holes 214, and into the rotor cavity 134 for discharge as previously described hereinabove.

Figure 9:
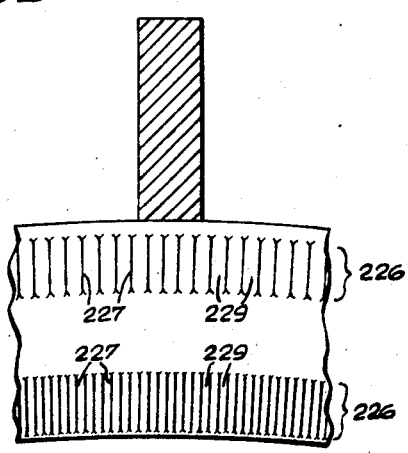
FIGURE 9 is a section view taken on line IX—IX of FIGURE 10.

FIGURE 9 is an enlarged view of the knurled lands 226 on strip 220 showing a multiplicity of ridges 227 and corresponding grooves 229.

Figure 10:
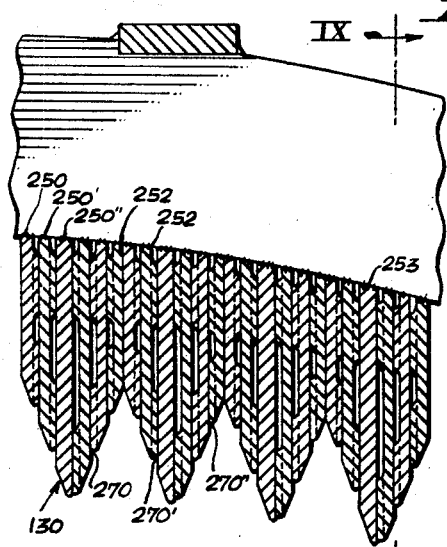
FIGURE 10 is an enlarged detail view in cross section taken on line X—X of FIGURE 7.

The shell assembly 240 (FIGURE 2) comprises the shell 104 described hereinabove; the "threads" 130, of which the shell 104 is wound into a conoid helix; and the longitudinal bars 242 and hoops 244. FIGURE 10 is an enlarged cross sectional view of the "thread" 130, which is constructed in accordance with the principles discussed in connection with blades 120, (FIGURE 8) differing only in the modifications employed to accommodate its winding into coil form. The "thread" 130 is an assembly of a number of strips 250, 250', 250" . . . of indefinite length (six being shown in FIGURE 10) each of which again has one flat side 252. The bending of the "thread" 130 required to achieve the wound coil form of shell 104 results in thinning of the outer edges 253 of the several strips 250. This must be compensated for either in the knurling operation (described later herein) or by pre-forming strip 250 so that the sides 252 and 254 are parallel, within tolerable limits, after coiling.

FIGURE 11 depicts, schematically, apparatus for finishing a strip 250 to the desired contour. Rolled strip material 250a of commercially available standard form is passed between a pair of sinking rollers 258, 260 having forms conjugate to the desired strip form shown in FIGURE 12. FIGURE 12 shows the cross section of the strip 250b, following its reforming by the rollers 258, 260. This strip 250b has a slight predetermined convergence of its two sides 252 and 254 such that $$t_2 = \frac{(D+W)t}{D}$$

approximately, in which:

$t_1$=thickness at inner edge, as coiled
$t_2$=thickness at outer edge, before coiling
$D$=nominal inner diameter of coil
$W$=width of strip Strip 250b is then passed between sinking rollers 262, 264 of cylindrical form, conjugate to the final form desired (as in FIGURE 9). The reduction of thickness $t_2$, effected by the rollers 262, 264, tends to precoil the strip 250 to the nominal diameter desired, which is a suitable approximation of the final diameter of the shell 104.

Precoiled strips 250 are next knurled as described in connection with blades 120, FIGURE 8; assembled to form the "thread" 130, FIGURE 2; and coiled to form the shell 104, most conveniently on a mandrel (not shown) which is conjugate to the described "threaded" surface 102. Longitudinal bars 242 and hoops 244 are attached at peripheral and longitudinal intervals on the outside wall of the shell 104 to make an independent (replaceable) shell assembly 240.

The assembly 240 is supported within the main body 24 at seats 280, 280', 280" . . . bored to be concentric with the longitudinal axis of rotor 108 in body webs 282, 282', 282".

The ends 112 and 114 of the shell are machined to fit squarely against flange 27 and stator ring face 186, the thus tapered ends of thread (or threads) 130 being secured by welding. Multiple thread lead may be used if desired in like manner for shell 104.

The shell 104, of the shell assembly 240, thus will be seen to have multiple stacked strips 250, 250', 250" . . . having fine knurled lands on one side 254 thereof, the ridges of which press firmly against the flat side 252 of the adjacent strip 250' . . . and the grooves of which so become passages 270, 270', 270" through which liquid can flow, in all respects like the filter septum previously described herein, except in conoid form. Each has substantial open area—the sum of transverse areas of the myriad fine knurled grooves.

Knurling of the lands 226 of strips 220 (FIGURE 8) or of strips 250 (FIGURE 9), of course, determines the flow area of each passage and of the total septum area. Presently it is considered preferable to use a "single cut" knurl having about 24–60° teeth per inch for the inner land 251, and about 12–60° teeth for the outer land 253. Coarser knurling gives greater open area and is quite permissible if fine matter is not readily released from the pulp. In pulps which do readily release fines, still finer knurling can be used. Motion of the pulp sliding in the septum surface scrubs so as to reduce or prevent "blinding" of the passages by small particles. Within the mat of pulp and along the surface of the septum, liquid flow is probably laminar, but rapidly accelerates in entering the passages. Here, the higher velocities are less likely to permit clogging.

FIGURE 13 depicts a simplified process flow diagram embodying the features of the instant invention. Pulp to be treated is delivered to a conventional slurry or stock pump 300 through a pipe line 302. From the pump 300, pulp is fed at superatmospheric pressure into one or more press units 304, alike in all respects to the press 20 described in detail hereinabove. The pulp moves through the gradually decreasing cross-sectional area of the compression zone 100 (FIGURE 2) to express the liquid (a first liquor) from the pulp. A valve 306 throttles the discharge of the expressed liquid so that the pressure of the liquid within the chambers (132, 134, FIGURE 2) is maintained at a pressure less than that of the entering pulp by a preselected difference. This difference is established by the pressure or head required to produce the desired flow through the filter septum (e.g. shell 104).

From the compression zone (100, FIGURE 2) dry pulp is forced by mechanical action through a discharge or dry zone (160, FIGURE 2) of substantially constant cross sectional area and suitable length, which effectively isolates the pressures of the feed and expressed liquid in the compression zone and into a chamber (180, FIGURE 2) in which the cake reexpands elastically in the presence of a second liquid introduced into the chamber (180 FIGURE 2) through line 308.

The first liquor expressed is returned through line 310 to the process, upstream, usually to supply the liquid required in a prior stage. Complete recycle balance is difficult and sometimes impossible or undesirable so that fresh make up liquor may be needed and any excess of the first liquor expressed must be otherwise disposed of.

The pulp, now re-slurried in the second liquor, is passed, either directly or through a retention tower 312, to a next stage press 314 in which the second liquor is separated from the dry pulp in like manner.

It will be completely apparent that the number of stages can be repeated as desired. For example, kraft pulp is readily and effectively washed to whatever level of chemical or "salt cake" carry over is required. In such process the "first liquor" expressed is kraft black liquor which is passed, by line 310, to the conventional evaporators. The "second liquor" with which the first press stage cake is rewet and slurried is water recycle via line 308 from a succeeding press stage 314 or other suitable source.

Bleaching of paper pulp is done in the same manner, the first liquor then being wash water from the last stage of washing, as hereinabove. The second liquor used will be, for example, sodium hypochlorite, chlorine dioxide solution or other bleaching agent in accordance with the chemical sequence preferred by the operator. The high solids content of the cake and the increased thoroughness of rewetting result in equal or improved effect with fewer stages than has heretofore been possible in washing, in bleaching, and in other liquid replacing processes. It is conceived within the scope of the instant invention, to so treat presoaked wood chips, replacing a first liquor, hot water, with a second liquor, a liguin solvent such as kraft white liquor. In this process, the retention tower 312 is sized to allow the digesting time-temperature cycle desired by the operator and is blown continuously into the second stage press 314, as cooked pulp.

In operation of the instant invention, a pulp or like material is delivered by pumping means, preferably at considerable pressure, to an inlet spout 46 (refer to FIGURE 1), the screw press 20, itself being connected to suitable drive means, not shown. As shown hereinabove operation may be of one only or of several stages, each stage employing one or more of press units 20 in parallel. Capacity or throughput is dependent upon inlet and outlet pulp conditions, but for established conditions, varies only with relative rotational speed of the rotor and stator or shell.

Pulp or slurry entering a press 20 at 11 parts liquid to 1 part solid to be reduced to 1 part liquid to 1 part solid at the dry zone (refer to FIGURE 2) requires a convergence ratio in the annular compression zone 100 of 6:1. Although a change in inlet consistency is reflected as ⅙ of such change at the outlet, it is well within the skill and practice of the art to control consistency so closely that for practical purposes constant quantity and quality of output can be expected.

Pulp is fed into the zone 100 by the co-action of vanes 142 and scroll 140 quantity (volumetric) being determined by the rotating speed. Within the compression zone 100, as has been described hereinabove, the pulp slides around within the shell 104 urged by the blades 120, and is advanced along the converging annular space by the helical thread 130. Liquid is expressed steadily and gradually from the pulp mass both through the shell (passages 270) and the rotor (passages 228–214). Because the mass is thin (in the direction of flow) and the compressing rate is slow, liquid travels slowly, normally in laminar or non-turbulent flow, well below velocities of particle entrainment. Thus fine matter is preserved in the mat and kept from the effluent liquid. Moreover, the surfaces of the mat of pulp are kept "wet," lubricating the surfaces over which the pulp mat slides, power required to overcome friction torque is correspondingly reduced. Friction is also lessened by the fact that the passages (228 and 270) are slightly recessed below the edges of the strips (220 and 250) of the septum. Since the advancing pulp mass is increasingly compressed at a rate proportional to the remaining pulp volume, and is nowhere permitted to reexpand, neither rewetting nor non-uniform liquid release can affect performance.

Liquid expressed from the advancing pulp is received in cavities 132 and 134. This may be discharged by gravity alone, and from the rotor cavity by siphon 136. Preferably, however, discharge of liquid should be restricted by valve means (as 306, FIGURE 13) so as to limit the pressure difference between zone 100 and the said cavities, i.e., across the filter septum.

Operation in stages, such as desired or required for pulp washing, or bleaching, as will be apparent to those skilled in the art, requires only that rewetting liquids be supplied in quantity and quality suitable to the specific process. In FIGURE 13, for example, liquor expressed in second stage press 314 at line 316 would be returned to the rewetting chamber of press 304 via line 308. Rewetting line 318 would, in turn be supplied with wash water from a next succeeding press stage (not shown).

A preferred embodiment of the instant invention having been described, and certain alternative constructions suggested, it will be apparent that, the aims and objectives can be at least partially achieved by other alternative constructions. For example, the helically wound thread 130 may be applied to the rotor while the blades 120 may be applied as the stationary member. One or the other may also be made imperforate.

I claim:

1. Apparatus for the continuous processing of pulps comprising means for saturating with a liquid a compressible solid material to form a pulp, pumping means receiving said pulp from said saturating means, a liquid extraction press having a conoidal stationary member and a conoidal rotating member defining therebetween a pulp compressing zone of regularly decreasing annular area, at least on of said members being a perforate filter septum, said septum comprizing a plurality of strips having two substantially parallel sides in close side by side relation, a land extending continuously along one side of each of said strips, a multiplicity of fine ridges defining therebetween an equal multiplicity of fine grooves extending completely across said land, said ridges pressed in close contact with the other side of a next adjacent strip such that said grooves offer means for liquid communication through said septum, means for receiving said liquid extracted by said press means for permitting elastic reexpansion of said compressible solid material only in intimate association with a second liquid receiving said solid material from said compressing zone, and means for delivering said solid material in said second liquid to subsequent processing.

2. A septum for a liquid extraction press comprising at least one continuous strip having generally parallel sides and an edge disposed in a plurality of helical turns, one of said sides being in close side by side relation respectively with an opposite one of said sides, said edge providing at least in part a surface adapted for relative sliding movement of liquid bearing material therealong in a direction generally parallel to the length of said continuous strip, a substantially continuous land extending along one side of said sides and having a multiplicity of ridges defining a multiplicity of grooves extending across said land, said ridges being in contact with the said opposite one of said sides, said grooves providing for fluid communication through said septum.

3. A septum as claimed in claim 2, said land being spaced inwardly of at least said edge and elevated with respect to said one side sufficiently to accommodate the depth of said grooves.

4. Apparatus for continuously separating liquid from pulp comprising a stationary member having a pulp contracting surface provided with at least one helical thread and an outer surface, said member being adapted for passage of liquid between the pulp contacting surface and the outer surface thereof, a rotor rotatably mounted coaxially of said member and having a pulp contacting surface provided with a plurality of blades extending outwardly thereof and generally longitudinally of said rotor, the pulp contacting surfaces respectively of said member and said rotor defining therebetween an annular space of continuously decreasing cross sectional area in the direction of movement of pulp through said space.

5. Apparatus for continuously separating liquid from pulp comprising a main housing, an infeed spout, a stationary perforate shell having a helically threaded inner surface of generally conoid form secured within said housing, a rotatable longitudinally bladed rotor having an outer surface of generally conoid form, means supporting said rotor for rotation coaxially with and in said shell, said inner and outer surfaces defining therebetween an annular space of regularly decreasing radial depth from end to end thereof, said rotor having an end wall surface, a head for said main housing having an inner wall surface facing said rotor wall surface, a plurality of radial vanes affixed to said rotor end wall forming pockets therebetween, a spiral ridge on said inner wall surface defining a groove spiralling radially outward, said vanes and said ridge coacting to urge pulp along said groove and said pockets and into said annular space, an imperforate stator ring having an inner surface and a rotor end ring having an outer surface, said ring inner and outer surfaces defining a dry zone for receiving and holding compressed pulp directly from said annular space, means defining pulp chamber for receiving from said dry zone and elastically reexpanding said pulp in the presence of a liquid, and means for receiving and discharging liquid expressed through said perforate shell.

6. A shell for a screw type liquid extraction press comprising a plurality of continuous generally rectangular strips in close side by side relation, one side of each strip having knurled ridges and grooves, said plurality of strips being continuously wound into closely coiled helical conoid form having an inner and an outer surface, at least one edge of each of said strips being offset relative to its adjacent strip such that the said plurality of strips defines a continuous helical thread on one of said surfaces.

7. A rotor for a screw type liquid extraction press comprising a body having means for rotatably mounting thereof, an end wall, a conoid wall joined thereto, a plurality of blades extending outwardly from said conoid wall and from end to end thereof, and defining grooves therebetween, a plurality of radial vanes affixed to extend outwardly from said end wall, said conoid wall and said end wall defining an interior cavity, liquid passage means extending through said blades and said conoid wall to admit liquid into said cavity and means for removing liquid from said cavity.

8. Apparatus for continuous separation of liquid and compressible solid material comprising a liquid retaining housing, first and second members mounted coaxially in said housing, one of said members being rotatable relative to the other, said members having confronting surfaces at least one of which has conoidal form, said confronting surfaces defining an annular space of regularly decreasing cross sectional area from end to end axially of said space, at least one of said members having substantial open area provided by a multiplicity of passages for flow of liquid from or to said space through the respective one of said surfaces, one of said surfaces comprising a plurality of generally axially extending radially projecting blades and intervening grooves, the other of said surfaces comprising at least one generally helicoid thread and groove, said surfaces cooperating to urge said material generally helically through said space in response to rotation of said rotatable member.

9. Screw press apparatus comprising two conoidal coaxial members defining therebetween a generally annular space, one of said members being mounted for rotation relative to the other of said members, at least one of said members being provided with a multiplicity of liquid passages therethrough of cross sectional width significantly less than the length of said passages, one of said members having at least one continuous helicoid thread and groove confronting said space, the other of said members having a plurality of blades and grooves extending from end to end thereof and confronting said space, said thread and said blades being disposed to move material through said space with rotation of said one member.

10. Screw press apparatus comprising a housing having a liquid receiving chamber, a first member mounted in said housing, a rotatable member having a liquid receiving chamber and mounted for rotation coaxially within said first member, each said member having a conoidal surface disposed to form a conoidal annual space therebetween, each said surface having a multiplicity of fine passages for liquid therethrough for conveying liquid from said space respectively into the chambers in said housing and said rotatable member, one of said surfaces having a helicoid thread and the other of said surfaces having a plurality of blades, said thread and said blades protruding into said space and cooperating to move pulp through said space during rotation of said rotatable member.

11. Apparatus as claimed in claim 8, said annular space decreasing in cross sectional area in the direction of movement of said material at a rate sufficient to prevent expansion of said material within said space.

12. Apparatus as claimed in claim 8, said annular space decreasing in cross sectional area at a rate effective to remove generally equal increments of liquid in equal increments of axial movement of said material.

13. Apparatus as claimed in claim 8, said annular space decreasing in cross sectional area at a rate effective to remove generally equal percentage fractions of the total volume of liquid and solid material remaining in said space at equal successive increments of movement of said material.

14. A septum for a liquid extraction press comprising a plurality of strips each having generally parallel sides and an edge extending from end to end thereof, said strips being disposed in close side by side relation, the respective edges cooperating to provide a surface for relative sliding movement therealong of a liquid bearing material in a direction generally parallel to the length of said strips, a substantially continuous land extending along one of said sides of generally each of said strips and having a multiplicity of ridges defining a multiplicity of grooves extending across said land, said ridges being in contact with the respectively opposite side of the next adjacent strip, said grooves providing for fluid communication through said septum.

15. A septum as claimed in claim 14, said land being spaced inwardly of said edge and being elevated with respect to said one side sufficiently to accommodate the depth of said grooves.

16. A septum as claimed in claim 14, at least one of the respective edges of said strips being offset with respect to an edge of a next adjacent strip such that the plurality of strips define a blade or thread extending outwardly from said surface for directing said sliding movement of said liquid bearing material therealong.

References Cited

UNITED STATES PATENTS

| | | | |
|---|---|---|---|
| 689,440 | 12/1901 | Tuska | 210—415 XR |
| 1,642,864 | 9/1927 | Williams | 210—497 XR |
| 1,722,814 | 7/1929 | Meakin | 100—128 XR |
| 1,772,262 | 8/1930 | Naugle | 210—415 XR |
| 2,355,091 | 8/1944 | McDonald | 100—73 XR |
| 2,583,600 | 1/1952 | Schreiber. | |
| 2,910,726 | 11/1959 | Parshall et al. | 146—182 XR |
| 3,273,495 | 9/1966 | Ozawa | 100—145 |

PETER FELDMAN, Primary Examiner

U.S. Cl. X.R.

100—72, 128, 145; 210—415, 497